United States Patent [19]
Mulvey et al.

[11] Patent Number: 6,106,027
[45] Date of Patent: Aug. 22, 2000

[54] PULL-OUT FAUCET HOSE

[76] Inventors: Philip A. Mulvey, 3745 Meadow Wood, Carson City, Nev. 89703; Andrew J. Huntington, 365 Springview Dr., Carson City, Nev. 89701; Charles T. Crisman, 955 Kennedy Dr., Carson City, Nev. 89706

[21] Appl. No.: 09/058,095

[22] Filed: Apr. 9, 1998

[51] Int. Cl.$^7$ ........................................ F16L 39/02
[52] U.S. Cl. ................ 285/222.2; 285/251; 285/249
[58] Field of Search ................. 285/251, 222.1, 285/222.2, 222.3, 222.4, 222.5, 249, 246

[56] References Cited

U.S. PATENT DOCUMENTS

| | | |
|---|---|---|
| 656,187 | 8/1900 | Gunnell . |
| 1,676,036 | 7/1928 | Levitt . |
| 2,809,056 | 10/1957 | Kaiser .................................. 285/251 |
| 2,810,594 | 10/1957 | Walsh et al. . |
| 2,858,147 | 10/1958 | Guarnaschelli .................... 285/251 |
| 3,140,106 | 7/1964 | Thomas et al. . |
| 3,237,974 | 3/1966 | Press . |
| 3,540,486 | 11/1970 | Flounders . |
| 3,877,734 | 4/1975 | Brozek ................................ 285/251 |
| 4,111,469 | 9/1978 | Kavick . |
| 4,367,889 | 1/1983 | Redl . |
| 4,431,031 | 2/1984 | Ettlinger . |
| 4,603,888 | 8/1986 | Goodall ............................... 285/251 |
| 4,611,828 | 9/1986 | Brunet ................................. 285/251 |
| 5,024,419 | 6/1991 | Mulvey . |
| 5,165,727 | 11/1992 | Valley . |
| 5,546,978 | 8/1996 | Parker . |
| 5,622,210 | 4/1997 | Crisman . |

FOREIGN PATENT DOCUMENTS

| | | | |
|---|---|---|---|
| 151090 | 9/1951 | Australia ............................ | 285/251 |

OTHER PUBLICATIONS

Four pages of technical information titled "Profile Extrusion Processing Guide" for Engage polyolefin elastomer, a product of DuPont Dow Elastomers, effective Apr. 1, 1995.

Two–page Engage product chart, listed with density in increasing order, undated.

Two–page Engage product information sheet, dated Nov. 1996.

*Primary Examiner*—Eric K. Nicholson
*Attorney, Agent, or Firm*—Monty L. Ross

[57] ABSTRACT

A flexible hose assembly used for pull-out faucets includes a hose having an inner tube and a spiral wound outer jacket. The hose assembly further includes at least one end connector disposed on an end of the hose that includes a jacket fitting having a tubular portion disposed between a spiral wound outer jacket and the inner tube. The tubular portion of the jacket fitting includes an externally threaded portion that engages the inner surface of the spiral wound outer jacket. The jacket fitting further includes a flange disposed at a distal end of the tubular portion wherein the flange abuts a distal end of an outer ferrule. The end connector also includes an insert fitting having a flange positioned on a distal end of a tubular portion. The tubular portion includes at least one external barb that engages the inner surface of the hose. A coupling nut with a central bore with a shoulder disposed therein receives the jacket fitting and the flange of the jacket fitting abuts the shoulder of the central bore. The jacket fitting secures the coupling nut to the hose. The coupling nut includes either female internal threads disposed in the central bore or male threads disposed on the exterior of the nut for attachment to connectors of the pull-out faucet. The wall thickness of the inner tube is desirably at least about 0.065 inches.

15 Claims, 3 Drawing Sheets

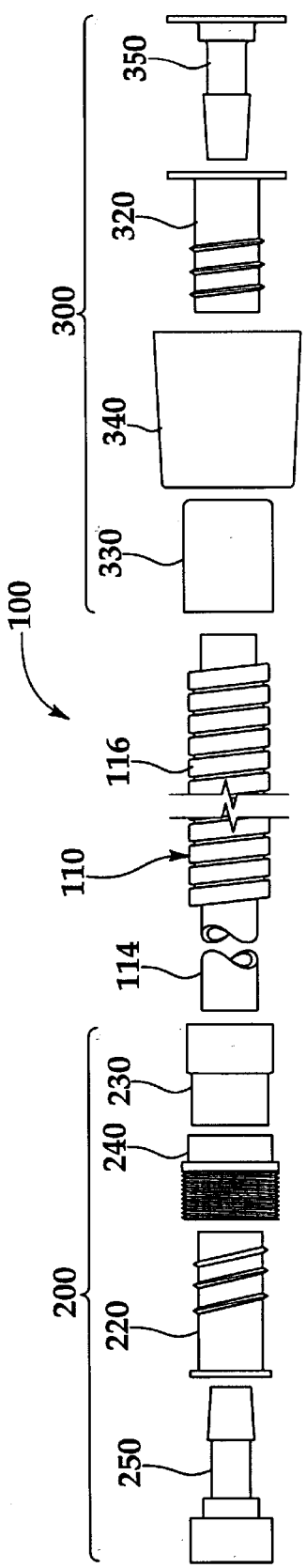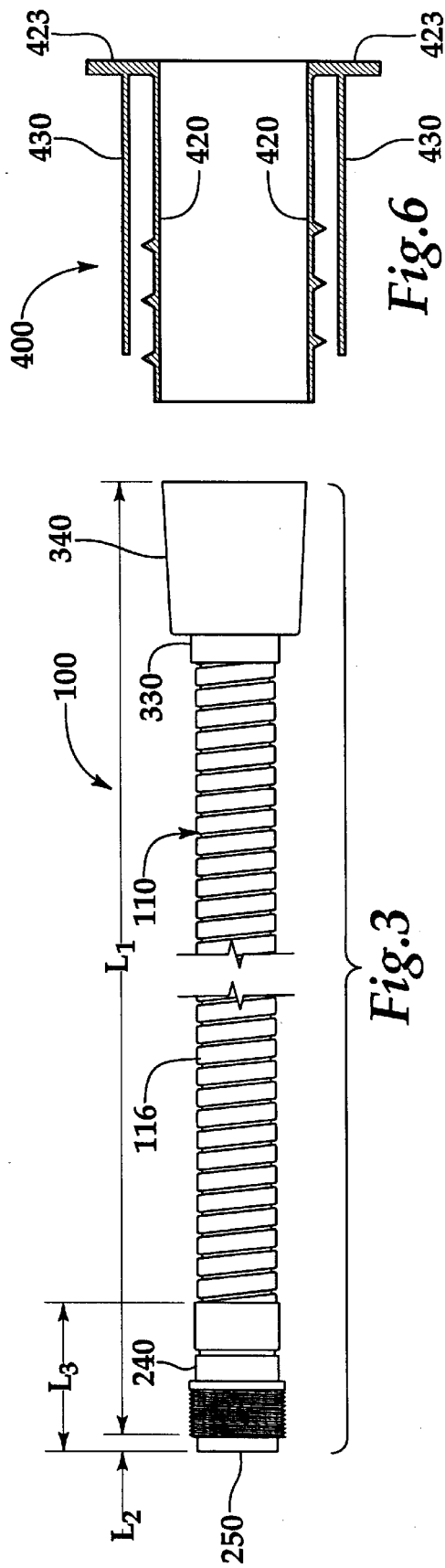

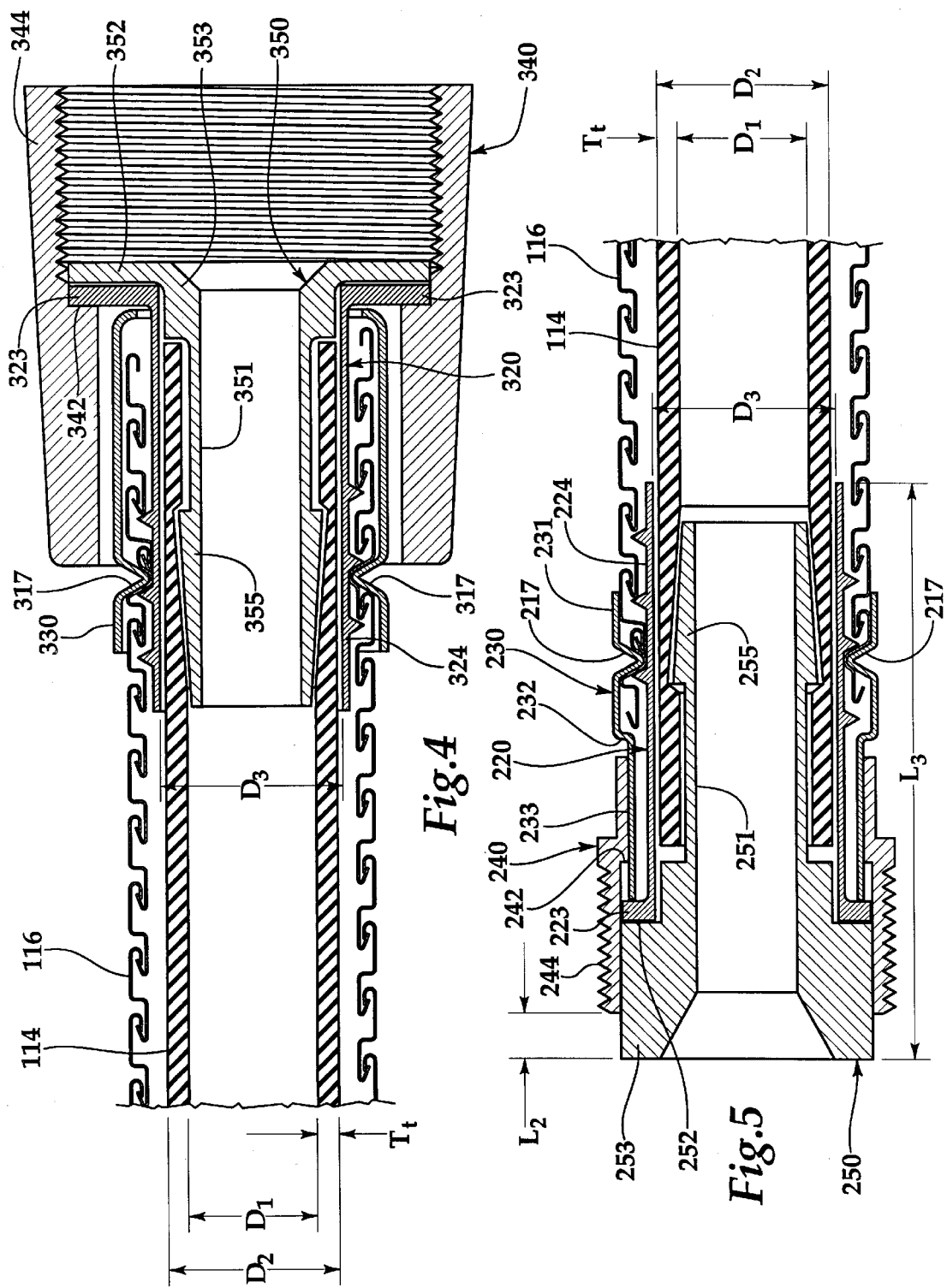

PULL-OUT FAUCET HOSE

TECHNICAL FIELD

This invention relates to a hose and connector assembly used for pull-out faucets and, more particularly, to a hose having a spiral wound outer jacket and end connectors that are secured to the respective ends of the hose by engagement with the spiral wound outer jacket.

BACKGROUND OF THE INVENTION

The design and use of faucets having pull-out sprayer hoses for kitchen sinks and bathroom lavatories is well-known in the art. In a conventional hot and cold water installation, the faucet comprises a housing containing a mixing valve, a pull-out spray head, and a flexible connector hose with end connectors on either end for attachment to an outlet port on the mixing valve and to an inlet port of the spray head. An example of a prior art pull-out faucet and hose assembly is illustrated in U.S. Pat. No. 5,546,978.

One of the problems with prior art hoses for pull-out faucets has been the inability to comply with the materials requirements of the National Sanitation Foundation Standard 61 ("NSF61"), for dispensing devices for potable water. A long-standing problem with prior art hoses occurs when the pressure on the hose is released by closing the mixing valve. Prior art hoses "dribble" water out of the outlet end because the tubing inside the connector hose has expanded like a balloon to fill the voids between the tube and the outer jacket. This problem increases with the age of the hose. Another problem encountered by prior art hoses and end connectors involves "blow offs" wherein the end connector is blown off the end of the hose when the hose is under supply line pressure. Additionally, many prior art end connectors leak on the inlet or outlet end of the hose. As discussed below, the pull-out hose assembly of the present invention overcomes the deficiencies of prior art pull-out hose assemblies.

SUMMARY OF THE INVENTION

The present invention comprises an improved hose and end connector assembly used for pull-out faucets. In a pullout faucet, the spray head may be lifted off the spigot and used as a hand sprayer. The present invention comprises a hose with end connectors on either end. The hose includes an inner tube having an innermost layer of a material approved under National Sanitation Foundation standard 61 ("NSF61") as being suitable for use in dispensing devices for potable water. The hose farther comprises an outer layer formed from a material preferably selected from thermoplastic rubber ("TPR"), thermoplastic olefin ("TPO"), and thermoplastic vulcanizate ("TPV") which allows flexibility but includes satisfactory compression set characteristics. One preferred material for use as the inner tube is disclosed in U.S. Pat. No. 5,622,210, which is incorporated by reference herein. The thickness of the inner tube is preferably at least about 0.065 inches.

The inner tube is desirably encased in an outer jacket preferably formed from a 300 series stainless steel strip that is spirally wound into an interlocked continuous jacket. Alternatively, the helical or spiral wound jacket may be formed from other types of material including, for example, fiber braid, monofilament, nickel-plated brass, brass or plastic. The end connectors on each end of the hose preferably include a jacket fitting with a flanged end. The outwardly facing portions of the respective end fittings may be male by male, female by female, male by female, quick disconnect, press-fit, or any combination thereof. The jacket end fittings can be made of nickel-plated brass, brass, steel, plastic or ceramic.

Each jacket fitting includes a tubular portion projecting from the flanged end. The tubular portion of the jacket fitting is inserted between the spiral wound outer layer and the inner tube of the hose. The tubular portion includes an externally threaded portion that engages the spiral windings of the spiral wound outer jacket. The threaded section may include interrupted threads to facilitate insertion into the spiral wound outer jacket. The interrupted threads may also allow vapor or liquid to escape from between the inner tube and the spiral wound outer jacket.

Each end connector further includes an outer ferrule having a central bore that, when assembled to the hose, receives the spiral wound outer jacket. Additionally, each end connector includes an insert fitting having a tubular portion with a flange positioned on a distal end thereof. The tubular portion preferably includes at least one barb for engagement with the interior surface of the inner tube.

According to one preferred embodiment, a female coupling nut is disposed on the outlet end of the hose assembly. The coupling nut includes a central bore with a shoulder disposed in the central bore at a proximal end of the bore and an internally threaded portion disposed on a distal end of the bore. When assembled to the hose, the central bore receives the jacket fitting and the flange of the jacket fitting abuts the shoulder in the proximal end of the central bore as the jacket fitting engages the spiral wound outer jacket and secures the coupling nut to the hose.

According to one preferred embodiment, a male coupling nut is disposed on the inlet end of the hose assembly. The coupling nut includes a central bore with a shoulder disposed in the central bore at a proximal end of the bore and an externally threaded portion disposed on a distal end of the nut. When assembled to the hose, the central bore receives the jacket fitting and the flange of the jacket fitting abuts the shoulder in the proximal end of the central bore as the jacket fitting engages the spiral wound outer jacket and secures the coupling nut to the hose.

The end connection is preferably assembled in the following order. First, the outer ferrule is disposed over the end of the hose. Next, the coupling nut is positioned adjacent to the ferrule. Third, the jacket fitting is inserted into the coupling nut and between the inner tube and the spiral wound outer jacket wherein the threaded portion engages the spiral windings of the jacket and the flange abuts the inside shoulder of the coupling nut and secures the coupling nut to the end of the hose. Next, the insert fitting is positioned inside the coupling nut such that the flange of the insert fitting abuts the flange of the jacket fitting. The tubular portion of the insert fitting passes through the jacket fitting, and the barb engages the inner surface of the inner tube so that the barb secures the inner tube in a water-tight manner. When installed for use with a pull-out faucet, the male coupling nut engages an outlet port on a mixing valve of the faucet and the female coupling nut engages an inlet port of the spray head.

BRIEF DESCRIPTION OF THE DRAWINGS

The present invention is further described with reference to the following drawings wherein:

FIG. 2 is an exploded view of a pull-out hose assembly of the present invention;

FIG. 3 is an assembled view of the pull-out hose assembly of FIG. 2;

FIG. 4 is an enlarged cross-section view of a female end connector of the pull-out hose assembly of FIG. 2;

FIG. 5 is an enlarged cross-section view of the male end connector of the pull-out hose assembly of FIG. 2; and FIG. 6 is an enlarged cross-section of a component of an alternate embodiment of the end connectors of the present invention wherein an outer ferrule and a threaded jacket fitting are combined as a single element.

DETAILED DESCRIPTION OF THE INVENTION

Figure 1:
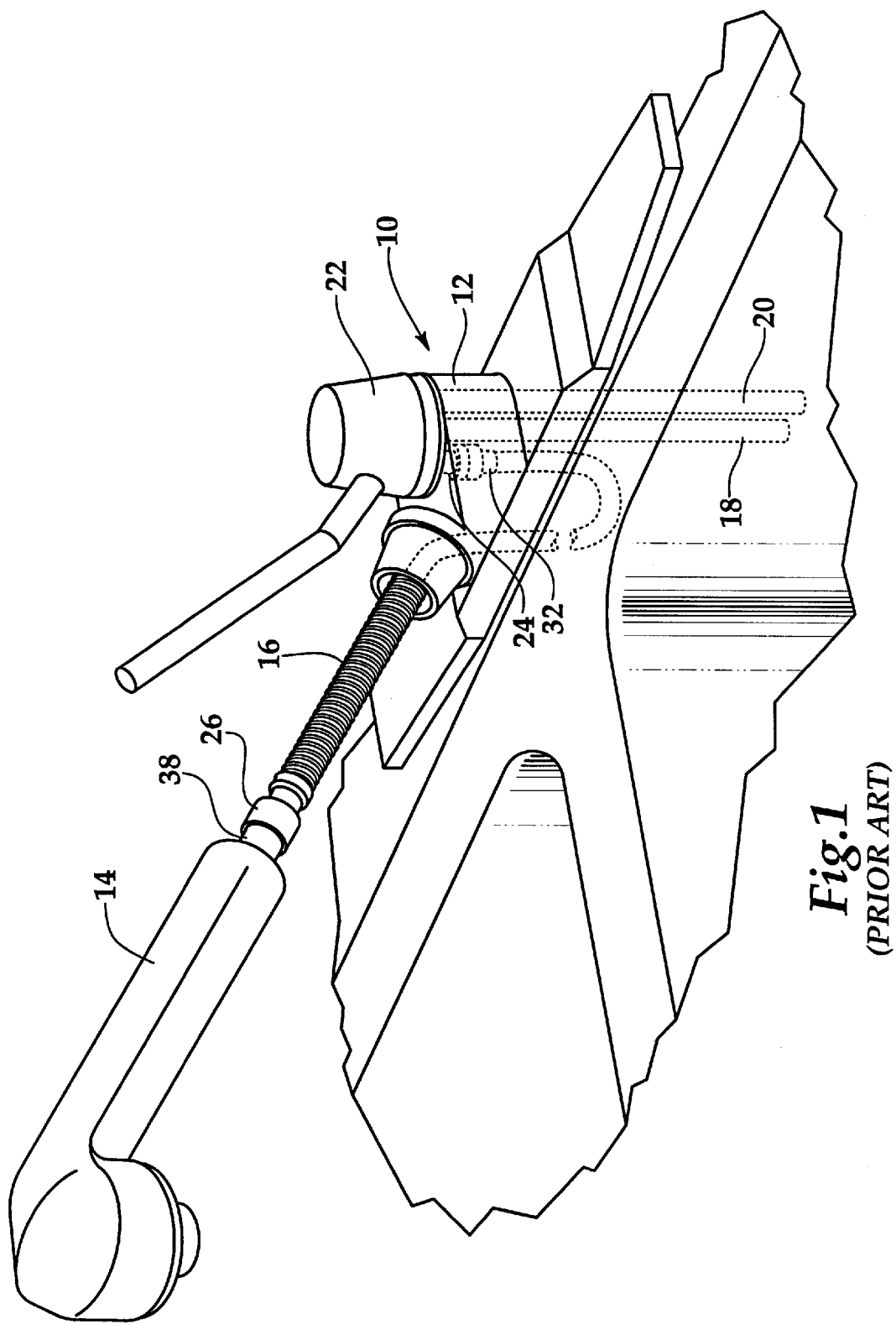
FIG. 1 is a perspective view of a typical prior art pull-out faucet and hose assembly.

FIG. 1 illustrates a prior art pull-out faucet and sprayer assembly. A conventional pull-out faucet and hose assembly 10 typically comprises a housing 12, a pull-out spray head 14, and a flexible connector hose 16. In a conventional hot and cold water installation, the faucet and hose assembly 10 receives water through a hot water supply line 18 and a cold water supply line 20 from an external source and directs the hot and cold water through a mixing valve 22. The mixing valve 22 is typically manually operated, and mixes the hot and cold water in the desired portions and adjusts the total flow to a desired level. After passing through mixing valve 22, the temperature-adjusted water is conveyed through a water outlet port 24 either inside or under housing 12 as illustrated in FIG. 1. In an installation where only cold water is supplied to the faucet, it will be apparent that the mixing function is not performed by valve 22. Hose 16 generally comprises an elongated, flexible, tubular polymeric conduit surrounded by corrugated stainless steel shielding. A preselected standard male end connector 32 and a female end connector 26 are attached to opposite ends of the hose 16. The male end connector 32 is attached directly to the water outlet port 24 of the faucet and the female end connector 26 is attached directly to inlet end 38 of spray head 14.

Referring now to FIGS. 2 through 5, wherein the pull-out hose assembly of the present invention is illustrated, it will be appreciated that the hose assembly of the present invention may be used for initial installation with pull-out faucet assemblies or to retrofit an existing pull-out faucet installations.

The present invention preferably includes a hose assembly 100 having a flexible reinforced co-extruded hose 110 with an inner tube 114 and end connectors 200 and 300 on either end. The inner tube 114 may be formed of a single material or co-extruded in layers as disclosed in U.S. Pat. No. 5,622,210, assigned to the assignee of the present invention, the disclosure of which is incorporated herein by reference. In a preferred embodiment, an innermost layer is formed from a material approved under National Sanitation Foundation standard 61 ("NSF61") as being suitable for use in dispensing devices for potable water, and an outer layer is formed from a material selected from thermoplastic rubbers, olefins and vulcanizates which allow flexibility but include satisfactory compression set characteristics. The outer layer will preferably have a durometer permitting a reliable interference fit with the fittings as discussed hereinafter. The outer layer may be foamed to achieve greater flexibility. Alternatively, the inner tube may be formed from a single extrusion (homogeneous) layer of TPR, TPO or TPV.

In the preferred embodiment the thickness $T_t$ of the tube 114 is at least about 0.065 inches. In most prior art conventional hose sprayers, the thickness of the hose is about 0.030 to 0.040 inches. The thicker tube of the present invention eliminates dripping because the thicker wall does not deform as readily, which reduces the "balloon" effect (as described in the Background Section) of the thinner prior art hose assemblies. In the preferred embodiment, the inside diameter $D_1$ of the tube 110 is about 0.190 inch.

The hose assembly 110 further includes a spiral wound outer jacket 116 that is preferably formed from a 300 series stainless steel strip that is spirally wound into an interlocked continuous jacket. The spiral construction of the jacket allows a high degree of flexibility and also includes excellent torsion and twisting capabilities Alternatively, the helical or spiral wound jacket may be formed from other materials such as fiber braid, monfilament, metals such as brass or nickel-plated brass or plastic. In an alternative embodiment, an additional inner reinforcement could be added between the inner liner and the outer jacket. This additional reinforcement provides additional dimensional stability.

An inlet end connector 200 is disposed on the inlet end of hose 110 and an outlet end connector 300 is disposed on the outlet end of hose 110. The end connectors each include jacket fittings 220 and 320, respectively, each having a flanged end 223 and 323 respectively. The flanged end may have varying sizes or shapes to accommodate various size connector nuts as described hereinafter. The jacket fittings 220 and 320 each include a tubular portion 224 and 324, respectively, projecting from the flanged end with a smooth inner bore having an internal diameter $D_3$ that is approximately equal to the outside diameter $D_2$ of the tube 114, such that when fittings 220 and 320 are assembled to hose 110 an interference fit exists between tube 114 and fitting 220 and 320. The tubular portion 224 and 324 is externally threaded with a thread that is disposed at the same pitch and lead as the spiral winding of the spiral wound outer jacket 116. When assembled, the thread on the jacket fitting 220 and 320 internally engages the spiral windings of the spiral wound outer jacket 116. Referring to FIG. 2, the threaded section of the jacket fitting 220 and 320 may include interrupted threads 221, 321, respectively, for facilitating the insertion into the spiral wound outer jacket 116. The interruption further includes the benefit of allowing vapor or liquid to escape from between the inner tube 114 and the outer spiral wound outer jacket 116. Solid threaded parts may trap liquid between the inner tube and outer jacket which may subsequently cause pit type or galvanic corrosion. The jacket fittings 220 and 320 may be formed from brass, nickel-plated brass, stainless steel, ceramic or plastic.

The end connectors 200 and 300 further include two outer ferrules 230 and 330 respectively. The first ferrule 230 has a first portion 231 having a larger outside diameter and internal diameter than a second portion 233. An internal annular shoulder 232 is formed at the juncture of the first portion 231 and the second portion 233. The larger end 231 of the ferrule 230 fits over the spiral wound outer jacket 116 and the annular shoulder 232 abuts the end of the spiral wound outer jacket 116. The smaller end of the ferrule 220 provides a neck and bearing surface on which a threaded male coupling nut 240 is disposed when the connector 200 is assembled to the hose. The second ferrule 330 slidably engages the exterior of the spiral wound outer jacket 116 and is positioned against the inlet end of the outer jacket. The ferrules 200 and 300 are preferably formed from brass, stainless steel or thermoplastics.

A pair of coupling nuts 240 and 340 are used to connect the hose assembly to the pullout-faucet or other appliances or instrumentation systems. Therefore, the coupling nuts 240 and 340 can include different configurations as previously mentioned on their respective distal ends for mating with a connector to which the hose assembly 100 of the present invention is to be assembled. In the preferred embodiment of the invention, a male coupling nut 240 includes a central bore with a shoulder 242 disposed in the central bore. When assembled, the proximal end 241 of the bore is disposed over the distal end 233 of the ferrule 230. The distal end 244 of the central bore receives the jacket fitting 220 and the flange 223 of the jacket fitting secures the male coupling nut 240 to the hose 110, but provides for rotational movement by the coupling nut. The coupling nut 240 further includes an externally threaded portion disposed on the distal end 244 for mating with a connector to which the hose assembly 100 is to be assembled.

A female coupling nut 340 includes a central bore with a shoulder 342 disposed in the central bore. When assembled, the proximal end 341 of the bore is disposed over the ferrule 230. The distal end 344 of the central bore receives the jacket fitting 320 and the flange 323 of the jacket fitting secures the female coupling nut 340 to the hose 110. The coupling nut 340 further includes an internally threaded portion disposed on the distal end 344 for mating with a connector to which the hose assembly 100 is to be assembled.

The end connectors 200 and 300 further include two insert fittings 250 and 350. The insert fittings 250 and 350 may vary to allow for various end configurations in the coupling nuts 240 and 340 respectively. In the preferred embodiment, the first insert fitting 250 comprises a tubular body with a distal end 251 and a proximal end 253. The proximal end 253 includes a flange 252 and the distal end includes external barbs 255. When assembled the distal end 251 of the insert fitting 250 passes through the jacket fitting 220 wherein the barb engages the inner surface of the inner tube 114 so that the barb wedges the tube between the barb and the inside of the jacket fitting 220 and effects a water-tight seal.

In the preferred embodiment, the second insert fitting 350 comprises a tubular body with a distal end 351 and a proximal end 353. The proximal end 353 includes a flange 352 and the distal end includes external barbs 355. When assembled, the distal end 351 of the insert fitting 350 passes through the jacket fitting 320 and the barb engages the inner surface of the inner tube 114 so that the barb wedges the tube between the barb and the inside of the jacket fitting 320 and effects a water-tight seal.

The end connector 200 is preferably assembled in the following order. First, the outer ferrule 230 is disposed over the end of the hose 110. Next, the coupling nut 240 is positioned adjacent to the ferrule 230. Third, the jacket fitting 220 is inserted into the coupling nut and between the inner tube 114 and the spiral wound outer jacket 116 wherein the threaded portion engages the spiral windings of the jacket and the flange 223 secures the coupling nut to the end of the hose. Next, the insert fitting 250 is positioned inside the coupling nut 240 such that the flange 252 of the insert fitting abuts the flange 223 of the jacket fitting 220. The distal portion 251 of the insert fitting 250 passes through the jacket fitting 220 wherein the barb 255 engages the inner surface of the inner tube 114 such that the barb secures the inner tube in a water-tight manner. The end connector 300 is assembled in a like manner. Ferrules 230, 330 are preferably crimped or staked to the jacket 116 and tubular portions 224, 324 as shown by opposed dimples 217, 317 in FIGS. 4 and 5, respectively.

When installed for use with a pull-out faucet, the male coupling nut engages an outlet port on a mixing valve of the faucet and the female coupling nut engages an inlet port of the spray head or the faucet. It will be understood by those skilled in the art that the hose assembly 100 of the present invention is not limited to use with pull-out faucets but may be used with all manner of plumbing connections, appliances and instrumentation systems.

When assembled as indicated in FIG. 3, the overall length $L_1$ of the hose assembly 100 as shown is approximately five feet. In the preferred embodiment, the assembled inlet end connector 200 has a length $L_2$ less than about 1.3 inches to facilitate feeding the connector 200 through the faucet body. The insert fitting 250 extends a distance $L_3$ of approximately 0.020 inch beyond the coupling nut 240 in order for the edge of the insert fitting 250 to abut the inside of the outlet port on the mixing valve and effect a water-tight seal.

FIG. 6 illustrates an enlarged cross-section of a component 400 for use as an alternative component in the end connectors 200 and 300 of the present invention. It will be understood by those skilled in the art that the element 400, which includes a ferrule portion 430, a jacket fitting portion 420 and flange portion 423, will function in a similar manner as heretofore described with regard to the parts 220, 230 and 223 and 320, 330 and 323.

When assembled as described herein, the present hose assembly 100 effectively eliminates the "blow off" problems associated with prior art hose assemblies. The jacket fittings 230 and 330 distribute the axial load to the spiral wound outer jacket, reducing the likelihood that axial force created by manually pulling on the spray head attached to the hose assembly will cause the connectors 200 or 300 to be pulled off the hose 110. The present invention will typically withstand 150 lbs. of tensile pull. Additionally, the distribution of the axial load reduces the likelihood that the end connectors 200 or 300 will be blown off the hose 110 due to internal line pressure. The present invention is desirably tested to withstand 1200 psig of hydrostatic burst pressure.

Another advantage of the present invention is that the present invention will comply with the NSF 61 no-lead requirements for dispensing devices which come in contact with potable water.

The present invention is distinguishable from prior art faucet sprayer hoses and hoses with spiral wound outer jackets in general.

Although preferred and alternate embodiments of the invention have been illustrated in the accompanying drawings and described herein, it will be understood that the invention is not limited to the embodiments disclosed but is capable of numerous modifications without departing from the scope of the invention as claimed.

We claim:

1. A flexible pull-out faucet hose assembly comprising:
   a hose including an inner tube with a wall defining an inner surface and an outer surface, and having a thickness of at least about 0.065 inches, and a spiral wound outer jacket having an inner surface disposed over the outer surface of the inner tube; and
   at least one end connector disposed on an end of the hose, said end connector including a jacket fitting having a tubular portion disposed between the spiral wound outer jacket and the inner tube, wherein said tubular portion includes an inner bore that receives an end portion of the inner tube, and said tubular portion further includes an externally threaded portion that engages the inner surface of the spiral wound outer jacket, wherein the external thread of the jacket fitting is interrupted for facilitating insertion into the spiral wound outer jacket.

2. A flexible pull-out faucet hose assembly comprising:
a hose including an inner tube with a wall defining an inner surface and an outer surface, said wall having a thickness of least about 0.065 inches, and a spiral wound outer jacket having an inner surface disposed over the outer surface of the inner tube: and
at least one end connector disposed on the end of the hose, said connector including a jacket fitting having a tubular portion disposed between the spiral wound outer jacket and the inner tube, wherein said tubular portion includes an inner bore that receives an end portion of the inner tube, and said tubular portion further includes an externally threaded portion that engages the inner surface of the spiral wound outer jacket; and
further comprising an outer ferrule formed as part of the jacket fitting,
wherein the outer ferrule includes a central bore that receives the outer spiral wound jacket and an end cap positioned at a distal end of the ferrule, and
the tubular portion of the jacket fitting is positioned axially inside the central bore of the outer ferrule and attached to the end cap, said end cap including an opening therein that is connected to the inner bore of the jacket fitting.

3. A flexible pull-out faucet hose assembly comprising:
a hose including an inner tube with a wall defining an inner surface and an outer surface, said wall having a thickness of at least about 0.065 inches, and a spiral wound outer jacket having an inner surface disposed over the outer surface of the inner tube; and
at least one end connector disposed on an end of the hose, said connector including a jacket fitting having a tubular portion disposed between the spiral wound outer jacket and the inner tube, wherein said tubular portion includes an inner bore that receives an end portion of the inner tube, and said tubular portion further includes an externally threaded portion that engages the inner surface of the spiral wound outer jacket,
wherein the end connector further includes an insert fitting having a flange positioned on a distal end of the tubular portion, said tubular portion including at least one external barb for engagement with the inner surface of the inner tube when assembled to an end of the hose.

4. A flexible pull-out faucet hose assembly comprising: a hose including:
an inner tube with a wall defining an inner surface and an outer surface, and
a spiral wound outer jacket having an inner surface disposed over the outer surface of the inner tube; and
at least one end connector disposed on an end of the hose, said connector including:
an outer ferrule having a central bore that receives the outer spiral wound jacket, and
a jacket fitting having a tubular portion disposed between the spiral wound outer jacket and the inner tube, wherein said tubular portion includes an inner bore that receives an end portion of the inner tube, said tubular portion includes an externally threaded portion that engages the inner surface of the spiral wound outer jacket, said jacket fitting further includes a flange disposed at a distal end of the tubular portion wherein the flange abuts a distal end of the ferrule,
an insert fitting having a flange positioned on a distal end of a tubular portion, said tubular portion including at least one external barb that engages the inner surface of the inner tube, and a coupling nut with a central bore with a shoulder disposed in the central bore and a threaded portion disposed on a distal end of the nut, wherein the central bore receives the jacket fitting and the flange of the jacket fitting secures the coupling nut to the hose; said wall having a thickness of at least about 0.065 inches.

5. The flexible hose assembly of claim 4 wherein the spiral wound outer jacket is formed from a stainless steel strip that is spirally wound into an interlocked continuous jacket.

6. The flexible hose assembly of claim 4 wherein the spiral wound outer jacket is formed from a polymeric strip that is spirally wound into an interlocked continuous jacket.

7. The flexible hose assembly of claim 4 wherein the inner tube is formed from a single extrusion layer of polymeric material selected from the group consisting of TPR, TPO and TPV.

8. The flexible hose assembly of claim 4 wherein the inner tube is formed from a co-extruded tube consisting of an inner layer of material suitable for potable water and an outer layer of polymeric material selected from the group consisting of TPR, TPO and TPV.

9. The flexible hose assembly of claim 4 wherein the external thread of the jacket fitting is interrupted for facilitating insertion into the spiral wound outer jacket.

10. A flexible pull-out faucet hose assembly comprising:
a hose including:
an inner tube with a wall defining an outer surface, and
a spiral wound outer jacket having an inner surface disposed over the outer surface on the inner tube;
a first end connector disposed on a first end of the hose, said connector including:
a first outer ferrule having a central bore that receives the outer spiral wound jacket, and
a first jacket fitting having a tubular portion disposed between the spiral wound outer jacket and the inner tube, wherein said tubular portion includes an inner bore that receives an end portion of the inner tube, said tubular portion includes an externally threaded portion that engages the inner surface of the spiral wound outer jacket, said first jacket fitting further includes a flange disposed at a distal end of the tubular portion wherein the flange abuts a distal end of the first ferrule,
a first insert fitting having a flange positioned on a distal end of a tubular portion, said tubular portion including at least one external barb that engages the inner surface of the hose, and
a female coupling nut with a central bore with a shoulder disposed in the central bore and a female threaded portion disposed in a distal end of the central bore, wherein the central bore receives the first jacket fitting and the flange of the first jacket fitting abuts the shoulder of the central bore and said first jacket fitting secures the female coupling nut to the hose; and
a second end connector disposed on a second end of the hose, said connector including:
a second outer ferrule having a central bore that receives the outer spiral wound jacket, and
a second jacket fitting having a tubular portion disposed between the spiral wound outer jacket and the inner tube, wherein said tubular portion includes an inner bore that receives an end portion of the inner tube, said tubular portion includes an externally threaded portion that engages the inner surface of the spiral wound outer jacket, said second jacket fitting further includes a flange disposed at a distal end of the tubular portion wherein the flange abuts a distal end of the second ferrule, a second insert fitting having a flange positioned on a distal end of a tubular portion, said tubular portion including at least one external barb that engages the inner surface of the hose, and a male coupling nut with a central bore with a shoulder disposed in the central bore and an externally threaded portion disposed on a distal end of the nut, wherein the central bore receives the second jacket fitting and the flange of the jacket fitting secures the male coupling nut to the hose; said wall having a thickness of at least about 0.065 inches.

11. The flexible hose assembly of claim 10 wherein the spiral wound outer jacket is formed from a stainless steel strip that is spirally wound into interlocked continuous jacket.

12. The flexible hose assembly of claim 10 wherein the spiral wound outer jacket is formed from a polymeric strip that is spirally wound into an interlocked continuous jacket.

13. The flexible hose assembly of claim 10 wherein the inner tube is formed from a single extrusion layer of polymeric material selected from the group consisting of TPR, TPO and TPV.

14. The flexible hose assembly of claim 10 wherein the inner tube is formed from a co-extruded tube consisting of an inner layer of material suitable for potable water and an outer layer of polymeric material selected from the group consisting of TPR, TPO and TPV.

15. The flexible hose assembly of claim 10 wherein the external thread of the jacket fitting is interrupted for facilitating insertion into the spiral wound outer jacket.

* * * * *